(12) United States Patent
Jin et al.

(10) Patent No.: US 9,990,924 B2
(45) Date of Patent: *Jun. 5, 2018

(54) SPEECH INTERACTION METHOD AND APPARATUS

(71) Applicant: HUAWEI TECHNOLOGIES CO.,LTD., Shenzhen, Guangdong (CN)

(72) Inventors: Hongbo Jin, Shenzhen (CN); Zhuolin Jiang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/444,340

(22) Filed: Feb. 28, 2017

(65) Prior Publication Data

US 2017/0263251 A1 Sep. 14, 2017

Related U.S. Application Data

(63) Continuation of application No. 14/601,026, filed on Jan. 20, 2015, now Pat. No. 9,583,101.

(30) Foreign Application Priority Data

Jan. 20, 2014 (CN) .......................... 2014 1 0026212

(51) Int. Cl.
*G10L 15/00* (2013.01)
*G10L 15/22* (2006.01)
(Continued)

(52) U.S. Cl.
CPC .......... *G10L 15/22* (2013.01); *G06K 9/00288* (2013.01); *G06K 9/00892* (2013.01);
(Continued)

(58) Field of Classification Search
USPC ................................................. 704/246–250
See application file for complete search history.

(56) References Cited

U.S. PATENT DOCUMENTS

| 7,069,215 B1 * | 6/2006 | Bangalore .......... G06K 9/00355 382/187 |
| 7,533,014 B2 * | 5/2009 | Mao ..................... G06K 9/6293 704/231 |

(Continued)

FOREIGN PATENT DOCUMENTS

| CN | 101390155 A | 3/2009 |
| CN | 101419671 A | 4/2009 |

(Continued)

OTHER PUBLICATIONS

U.S. Appl. No. 14/601,026, filed Jan. 20, 2015.
(Continued)

*Primary Examiner* — Jesse Pullias
(74) *Attorney, Agent, or Firm* — Leydig, Voit & Mayer, Ltd.

(57) ABSTRACT

The present invention discloses a speech interaction method and apparatus, and pertains to the field of speech processing technologies. The method includes: acquiring speech data of a user; performing user attribute recognition on the speech data to obtain a first user attribute recognition result; performing content recognition on the speech data to obtain a content recognition result of the speech data; and performing a corresponding operation according to at least the first user attribute recognition result and the content recognition result, so as to respond to the speech data. According to the present invention, after speech data is acquired, user attribute recognition and content recognition are separately performed on the speech data to obtain a first user attribute recognition result and a content recognition result, and a
(Continued)

corresponding operation is performed according to at least the first user attribute recognition result and the content recognition result.

14 Claims, 4 Drawing Sheets

(51) Int. Cl.
*G10L 17/26* (2013.01)
*G10L 17/10* (2013.01)
*G10L 15/183* (2013.01)
*G10L 15/25* (2013.01)
*G10L 17/22* (2013.01)
*G06K 9/00* (2006.01)

(52) U.S. Cl.
CPC ............ *G10L 15/183* (2013.01); *G10L 15/25* (2013.01); *G10L 17/10* (2013.01); *G10L 17/22* (2013.01); *G10L 17/26* (2013.01); *G10L 2015/223* (2013.01); *G10L 2015/227* (2013.01)

(56) References Cited

U.S. PATENT DOCUMENTS

| | | | | |
|---|---|---|---|---|
| 9,190,058 | B2* | 11/2015 | Klein | G06F 3/167 |
| 9,583,101 | B2* | 2/2017 | Jin | G10L 15/22 |
| 2002/0135618 | A1* | 9/2002 | Maes | G06F 3/0481 |
| | | | | 715/767 |
| 2002/0178344 | A1* | 11/2002 | Bourguet | G06K 9/00335 |
| | | | | 712/1 |
| 2006/0229879 | A1 | 10/2006 | Yu et al. | |
| 2007/0198263 | A1 | 8/2007 | Chen | |
| 2014/0122089 | A1 | 5/2014 | Lee et al. | |
| 2015/0088515 | A1* | 3/2015 | Beaumont | G10L 17/06 |
| | | | | 704/251 |

FOREIGN PATENT DOCUMENTS

| | | |
|---|---|---|
| CN | 102802114 A | 11/2012 |
| CN | 102984359 A | 3/2013 |
| CN | 103024530 A | 4/2013 |
| CN | 103186326 A | 7/2013 |
| CN | 103236259 A | 8/2013 |
| CN | 103491411 A | 1/2014 |
| KR | 101284594 B1 | 7/2013 |

OTHER PUBLICATIONS

Fang et al., "Automatic Age Estimation Based on Visual and Audio Information," Journal of Software, vol. 22, No. 7, pp. 1503-1523, Coden Ruxuew (Jul. 2011).

Cheng et al., "Speaker gender recognition based on combining the contribution of MFCC and pitch features," Journal of Huazhong University of Science and Technology (Natural Science Edition), vol. 41, Sup. I, pp. 108-120, (Oct. 2013).

Müller, "Automatic Recognition of Speakers' Age and Gender on the Basis of Empirical Studies," Interspeech 2006—ICSLP, pp. 2118-2121, Pittsburgh, Pennsylvania (2006).

Shafran et al., "Voice Signatures," IEEE ASRU 2003, pp. 31-36, Institute of Electrical and Electronics Engineers, New York, New York, (2003).

* cited by examiner

SPEECH INTERACTION METHOD AND APPARATUS

CROSS-REFERENCE TO RELATED APPLICATIONS

This application is a continuation of U.S. patent application Ser. No. 14/601,026, filed on Jan. 20, 2015, now U.S. Pat. No. 9,583,101. U.S. patent application Ser. No. 14/601,026 claims priority to Chinese Patent Application No. 201410026212.7, filed on Jan. 20, 2014. All of the aforementioned patent applications are hereby incorporated by reference in their entireties.

TECHNICAL FIELD

The present invention relates to the field of speech processing technologies, and in particular, to a speech interaction method and apparatus.

BACKGROUND

As information technologies develop continuously, user interaction technologies are widely applied. As a new-generation user interaction mode following keyboard interaction, mouse interaction, and touchscreen interaction, speech interaction, by virtue of convenience and rapidness, is gradually accepted by the majority of users and has a potential prospect of being promoted on a large scale. For example, there is a growing number of speech-related applications on a smart mobile terminal, and smart television manufacturers are replacing traditional handheld remote controllers by introducing a speech interaction technology.

In the prior art, speech interaction is based on a speech recognition technology, that is, after receiving a speech segment, a speech interaction system first performs content recognition on speech data to obtain a content recognition result and learns a user intent according to the content recognition result, and then, according to the user intent, the speech interaction system performs an operation corresponding to the speech, or returns information corresponding to the speech to an end user.

In a process of implementing the present invention, the inventor finds that at least the following problems exist in the prior art:

In the prior art, when speech content is consistent, operations performed by or results returned by the speech interaction system are consistent; therefore, there are relatively few forms of responding to the speech content and flexibility is not high.

SUMMARY

To resolve the problems in the prior art, embodiments of the present invention provide a speech interaction method and apparatus. The technical solution is as follows:

According to a first aspect, a speech interaction method is provided, where the method includes:
  acquiring speech data of a user;
  performing user attribute recognition on the speech data to obtain a first user attribute recognition result;
  performing content recognition on the speech data to obtain a content recognition result of the speech data; and
  performing a corresponding operation according to at least the first user attribute recognition result and the content recognition result, so as to respond to the speech data.

In a first possible implementation manner of the first aspect, the method further includes:
  collecting a user image; and
  when it is detected that the number of people in the user image is a preset value, performing the step of performing user attribute recognition on the speech data.

With reference to the first possible implementation manner of the first aspect, in a second possible implementation manner of the first aspect, after it is detected that the number of people in the user image is a preset value, the method further includes:
  extracting face data from the user image; and
  performing face recognition on the face data to obtain a second user attribute recognition result.

With reference to the second possible implementation manner of the first aspect, in a third possible implementation manner of the first aspect, the performing a corresponding operation according to at least the first user attribute recognition result and the content recognition result includes:
  weighting the first user attribute recognition result and the second user attribute recognition result to obtain a final user attribute recognition result; and
  performing a corresponding operation according to the final user attribute recognition result and the content recognition result.

With reference to the third possible implementation manner of the first aspect, in a fourth possible implementation manner of the first aspect, the performing a corresponding operation according to the final user attribute recognition result and the content recognition result includes:
  determining vocabulary content corresponding to the final user attribute recognition result; and
  performing a corresponding operation according to the vocabulary content corresponding to the final user attribute recognition result and according to the content recognition result.

With reference to the fourth possible implementation manner of the first aspect, in a fifth possible implementation manner of the first aspect, before the determining vocabulary content corresponding to the final user attribute recognition result, the method further includes:
  presetting a user attribute, where the user attribute includes at least a gender attribute and an age attribute; and
  presetting multiple vocabularies corresponding to the gender attribute and multiple vocabularies corresponding to the age attribute, and storing correspondences; and
  the determining vocabulary content corresponding to the final user attribute recognition result includes:
  searching, in a preset correspondence between the gender attribute and a vocabulary and a preset correspondence between the age attribute and a vocabulary, for a vocabulary corresponding to the final user recognition result, and using a found vocabulary as the vocabulary content corresponding to the final user attribute recognition result.

With reference to the first aspect, in a sixth possible implementation manner of the first aspect, before the performing user attribute recognition on the speech data to obtain a first user attribute recognition result of the speech data, the method further includes:
  presetting a correspondence between a spectrum signature and a user attribute recognition result, where the user attribute recognition result includes at least a gender attribute recognition result and an age attribute recognition result; and the performing user attribute recognition on the speech data to obtain a first user attribute recognition result of the speech data includes:

performing frequency domain transformation processing on the speech data to obtain a spectrum signature of the speech data; and searching, in a preset correspondence between each spectrum signature and each user attribute recognition result, for a user attribute recognition result corresponding to the spectrum signature of the speech data, and using a found user attribute recognition result as the first user attribute recognition result of the speech data.

According to a second aspect, a speech interaction apparatus is provided, where the apparatus includes:

an acquiring module, configured to acquire speech data of a user;

a user attribute recognition module, configured to perform user attribute recognition on the speech data to obtain a first user attribute recognition result;

a content recognition module, configured to perform content recognition on the speech data to obtain a content recognition result of the speech data; and an executing module, configured to perform a corresponding operation according to at least the first user attribute recognition result and the content recognition result, so as to respond to the speech data.

In a first possible implementation manner of the second aspect, the apparatus further includes:

a collecting module, configured to collect a user image, where the user attribute recognition module is configured to, when it is detected that the number of people in the user image is a preset value, perform the step of performing user attribute recognition on the speech data.

With reference to the first possible implementation manner of the second aspect, in a second possible implementation manner of the second aspect, the apparatus further includes:

an extracting module, configured to extract face data from the user image; and a face recognition module, configured to perform face recognition on the face data to obtain a second user attribute recognition result.

With reference to the second possible implementation manner of the second aspect, in a third possible implementation manner of the second aspect, the executing module includes:

a weighting unit, configured to weight the first user attribute recognition result and the second user attribute recognition result to obtain a final user attribute recognition result; and an executing unit, configured to perform a corresponding operation according to the final user attribute recognition result and the content recognition result.

With reference to the third possible implementation manner of the second aspect, in a fourth possible implementation manner of the second aspect, the executing unit includes:

a determining subunit, configured to determine vocabulary content corresponding to the final user attribute recognition result; and an executing subunit, configured to perform a corresponding operation according to the vocabulary content corresponding to the final user attribute recognition result and according to the content recognition result.

With reference to the fourth possible implementation manner of the second aspect, in a fifth possible implementation manner of the second aspect, the apparatus further includes:

a user attribute setting module, configured to preset a user attribute, where the user attribute includes at least a gender attribute and an age attribute; and a vocabulary correspondence setting module, configured to preset multiple vocabularies corresponding to the gender attribute and multiple vocabularies corresponding to the age attribute, and store correspondences; where the determining subunit is configured to search, in a preset correspondence between the gender attribute and a vocabulary and a preset correspondence between the age attribute and a vocabulary, for a vocabulary corresponding to the final user recognition result, and use a found vocabulary as the vocabulary content corresponding to the final user attribute recognition result.

With reference to the second aspect, in a sixth possible implementation manner of the second aspect, the apparatus further includes:

a spectrum signature setting module, configured to preset a correspondence between a spectrum signature and a user attribute recognition result, where the user attribute recognition result includes at least a gender attribute recognition result and an age attribute recognition result, where the user attribute recognition module is configured to perform frequency domain transformation processing on the speech data to obtain a spectrum signature of the speech data; and search, in a preset correspondence between each spectrum signature and each user attribute recognition result, for a user attribute recognition result corresponding to the spectrum signature of the speech data, and use a found user attribute recognition result as the first user attribute recognition result of the speech data.

Beneficial effects brought by the technical solutions provided in the embodiments of the present invention are as follows:

After speech data of a user is acquired, user attribute recognition and content recognition are separately performed on the speech data to obtain a first user attribute recognition result and a content recognition result of the speech data, and a corresponding operation is performed according to at least the first user attribute recognition result and the content recognition result. Because attribute recognition is performed on the speech data, and user attributes of different users may be different, response operations that are performed or results that are returned may also be different even for a same content recognition result. As a result, a same speech corresponds to multiple forms of response, which not only enriches manners of responding to speech and improves flexibility of responding to speech, but also makes a speech response result better satisfy a user requirement.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the present invention clearer, the following further describes the embodiments of the present invention in detail with reference to the accompanying drawings.

Figure 1:
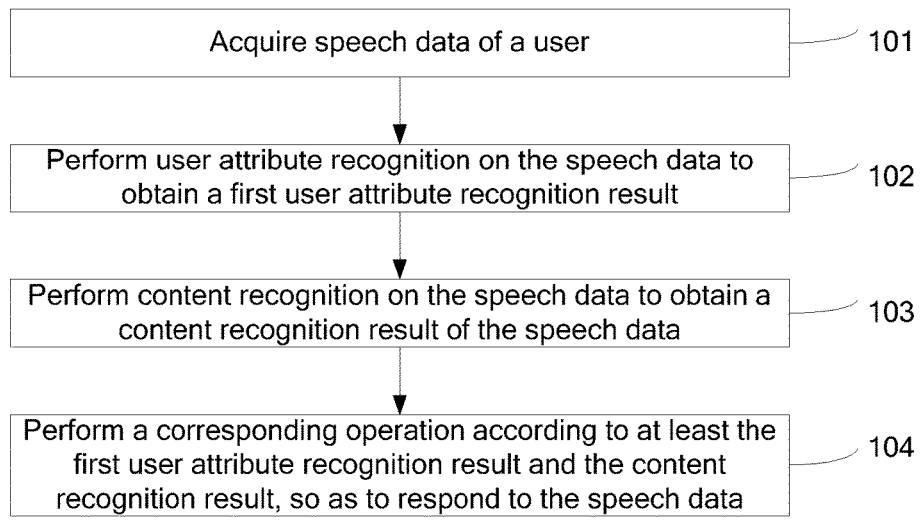
FIG. 1 is a flowchart of a speech interaction method according to Embodiment 1 of the present invention.

This embodiment of the present invention provides a speech interaction method. Referring to FIG. 1, a procedure of the method provided in this embodiment includes:

101. Acquire speech data of a user.

102. Perform user attribute recognition on the speech data to obtain a first user attribute recognition result.

103. Perform content recognition on the speech data to obtain a content recognition result of the speech data.

104. Perform a corresponding operation according to at least the first user attribute recognition result and the content recognition result, so as to respond to the speech data.

According to a method provided in this embodiment, after speech data of a user is acquired, user attribute recognition and content recognition are separately performed on the speech data to obtain a first user attribute recognition result and a content recognition result of the speech data, and a corresponding operation is performed according to at least the first user attribute recognition result and the content recognition result. Because attribute recognition is performed on the speech data, and user attributes of different users may be different, response operations that are performed may also be different even for a same content recognition result. As a result, a same speech corresponds to multiple forms of response, which not only enriches manners of responding to speech and improves flexibility of responding to speech, but also makes a speech response result better satisfy a user requirement.

Optionally, the method further includes:

collecting a user image; and when it is detected that the number of people in the user image is a preset value, performing the step of performing user attribute recognition on the speech data.

Optionally, after it is detected that the number of people in the user image is a preset value, the method further includes:

extracting face data from the user image; and performing face recognition on the face data to obtain a second user attribute recognition result.

Optionally, the performing a corresponding operation according to at least the first user attribute recognition result and the content recognition result includes:

weighting the first user attribute recognition result and the second user attribute recognition result to obtain a final user attribute recognition result; and performing a corresponding operation according to the final user attribute recognition result and the content recognition result.

Optionally, the performing a corresponding operation according to the final user attribute recognition result and the content recognition result includes:

determining vocabulary content corresponding to the final user attribute recognition result; and performing a corresponding operation according to the vocabulary content corresponding to the final user attribute recognition result and according to the content recognition result.

Optionally, before the determining vocabulary content corresponding to the final user attribute recognition result, the method further includes:

presetting a user attribute, where the user attribute includes at least a gender attribute and an age attribute; and presetting multiple vocabularies corresponding to the gender attribute and multiple vocabularies corresponding to the age attribute, and storing correspondences; and the determining vocabulary content corresponding to the final user attribute recognition result includes:

searching, in a preset correspondence between the gender attribute and a vocabulary and a preset correspondence between the age attribute and a vocabulary, for a vocabulary corresponding to the final user recognition result, and using a found vocabulary as the vocabulary content corresponding to the final user attribute recognition result.

Optionally, before the performing user attribute recognition on the speech data to obtain a first user attribute recognition result of the speech data, the method further includes:

presetting a correspondence between a spectrum signature and a user attribute recognition result, where the user attribute recognition result includes at least a gender attribute recognition result and an age attribute recognition result; and the performing user attribute recognition on the speech data to obtain a first user attribute recognition result of the speech data includes:

performing frequency domain transformation processing on the speech data to obtain a spectrum signature of the speech data; and searching, in a preset correspondence between each spectrum signature and each user attribute recognition result, for a user attribute recognition result corresponding to the spectrum signature of the speech data, and using a found user attribute recognition result as the first user attribute recognition result of the speech data.

Any combination of all the foregoing optional technical solutions may be adopted to form an optional embodiment of the present invention, and details are not described herein again.

Figure 2:
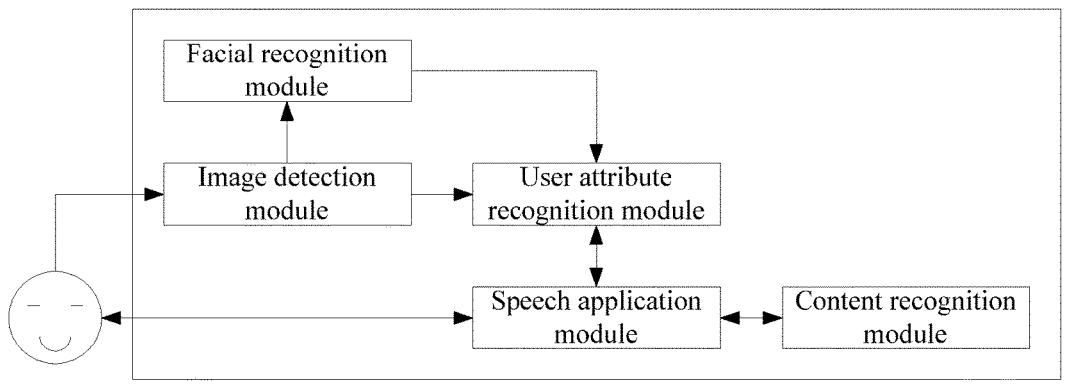
FIG. 2 is a system architecture diagram of a speech interaction system according to Embodiment 2 of the present invention.
Figure 3:
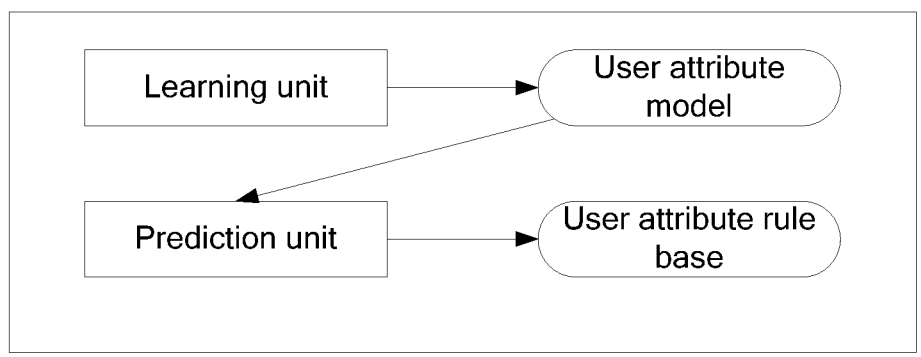
FIG. 3 is a schematic diagram of an internal structure of a user attribute recognition module according to Embodiment 2 of the present invention.

This embodiment of the present invention provides a speech interaction method. With reference to Embodiment 1 and a speech interaction system shown in FIG. 2, the following describes in detail the speech interaction method provided in this embodiment of the present invention. In FIG. 2, the speech interaction system is divided into five parts in total, which are an image detection module, a user attribute recognition module, a face recognition module, a content recognition module, and a speech application module. The image detection module is configured to detect the number of people in a collected user image. The user attribute recognition module is configured to perform user attribute recognition on speech of a user. The face recognition module is configured to, when the image detection module detects that the number of people in the user image is a preset value, perform recognition on face data of the user image. The content recognition module is configured to perform content recognition on speech data. The speech application module is configured to acquire the speech data of the user, and perform a corresponding operation according to a recognition result output by the user attribute recognition module, a recognition result output by the face recognition module, and a recognition result output by the content recognition module. FIG. 3 is a diagram of an internal structure of the user attribute recognition module. In FIG. 3, the user attribute recognition module includes 4 parts in total, which are a learning unit, a user attribute model, a prediction unit, and a user attribute rule base. The learning unit is configured to collect a speech sample, and obtain a user attribute model in a training phase by using a method of machine learning or statistical learning and according to the collected speech sample. The user attribute model may be a machine learning model and may also be a rule-based statistical learning model, where the user attribute model includes at least a gender model and an age model; the gender model records a correspondence between a spectrum signature of speech data and a gender; and the age model records a correspondence between a spectrum signature of speech data and an age. The prediction unit is configured to perform recognition on currently input speech data according to the user attribute model in an actual use phase, so as to obtain a user attribute recognition result. The user attribute rule base is established by means of offline statistics collection or by using a theme model, stores a correspondence between a user attribute and a vocabulary, and is configured to output vocabulary content corresponding to the user attribute recognition result.

Figure 4:
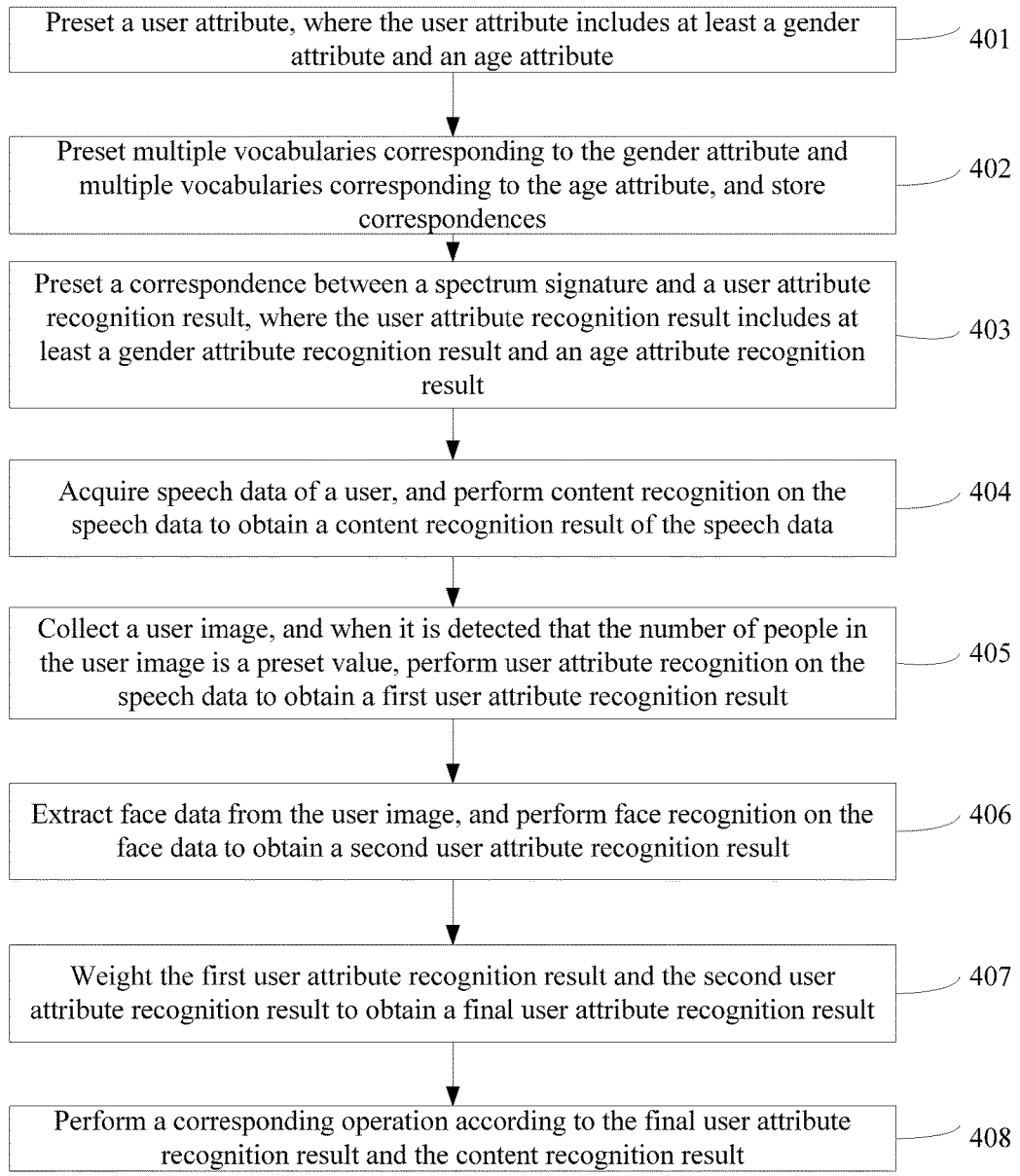
FIG. 4 is a flowchart of a speech interaction method according to Embodiment 2 of the present invention.

Referring to FIG. 4, a procedure of the method provided in this embodiment includes:

401. Preset a user attribute, where the user attribute includes at least a gender attribute and an age attribute.

The user attribute is used to represent a user identity, which may include an occupation attribute, a race attribute, or the like in addition to the gender attribute and the age attribute. Content included in the user attribute is not specifically limited in this embodiment. In this embodiment, that the user attribute includes the gender attribute and the age attribute is used only as an example for illustration.

402. Preset multiple vocabularies corresponding to the gender attribute and multiple vocabularies corresponding to the age attribute, and store correspondences.

For the gender attribute, affected by a factor such as a preference difference or a physiological difference between a male and a female, preference orientations of a male and a female on things are generally different. For example, for a sports program, a female may prefer to a sports program that is relatively literary, such as gymnastics and feature skating, whereas a male may prefer to a sports program that is relatively drastic, such as basketball and football. Therefore, when multiple vocabularies corresponding to the gender attribute are set, the multiple vocabularies are separately set for a male and a female. For example, for a female, multiple vocabularies corresponding thereto may be set to cosmetics, baby feeding, gymnastics, low risk, fashion, cuisine, or the like; and for a male, multiple vocabularies corresponding thereto may be set to sports, watch, science and technology, football, high risk, education, fitness, or the like. After the multiple vocabularies corresponding to the gender attribute are set, the correspondence between the gender attribute and the vocabularies may be stored in the user attribute rule base shown in FIG. 3.

For the age attribute, affected by an age difference, preference orientations of young people, adults, and elderly people on things are generally different. For example, elderly people may concern more about aspects such as healthcare, medical treatment, and tai chi, whereas young people and adults may concern more about aspects such as fashion, travel, and fine foods. Therefore, when multiple vocabularies corresponding to the age attribute are set, the multiple vocabularies are separately set for different age groups. For example, for elderly people, multiple vocabularies corresponding thereto may be set to livelihood after retirement, leisure, health, medical treatment, current events, tai chi chuan, gate ball, or the like; for adults, multiple vocabularies corresponding thereto may be set to fashion, fine foods, game, adventure, work, investment, or the like; and for young people, multiple vocabularies corresponding thereto may be set to education, study, extracurricular activity, vacation, exam, or the like. After the multiple vocabularies corresponding to the age attribute are set, the correspondence between the age attribute and the vocabularies may be stored in the user attribute rule base shown in FIG. 3.

403. Preset a correspondence between a spectrum signature and a user attribute recognition result, where the user attribute recognition result includes at least a gender attribute recognition result and an age attribute recognition result.

In this embodiment, a process of setting a spectrum signature and a user attribute recognition result is also a process of establishing a gender model and an age model. For a gender, a pitch frequency of a male is mostly between 100 Hz and 200 Hz, whereas a pitch frequency of a female is mostly between 200 Hz and 350 Hz. Because there is a significant difference between pitch frequencies of a male and a female, genders of users who input speech data may be distinguished by a pitch frequency in the spectrum signature. For an age, elderly people generally speak more slowly than young people and adults, and this is reflected at a spectrum signature in that waveforms corresponding to speech data of the elderly people are relatively close. Therefore, ages of users who input speech data may be distinguished by density of frequency waveforms.

In this embodiment, a manner of machine learning or statistical learning may be adopted to establish a gender model and an age model. That is, a large number of speech samples may be collected in advance. After frequency domain transformation is performed on each speech sample, a spectrum signature of each speech sample is analyzed, and spectrum signatures are summarized according to attribute information of a provider of each speech sample such as a gender and an age, so as to obtain correspondences between the spectrum signature and the gender attribute, and between the spectrum signature and the age attribute.

In addition, if the user attribute further includes other attributes such as an occupation attribute and a race attribute, other models such as an occupation model and a race model may also be established correspondingly by using the foregoing manner of establishing a gender model and an age model. When a large number of speech samples collected in advance are processed, an electrical signal waveform and a spectrum signature of each speech sample may be analyzed at the same time, so that attribute information of a provider of each speech sample such as an occupation and a race is summarized according to the electrical signal waveform and the spectrum signature, so as to obtain an occupation model and a race model.

It should be noted that, when the method provided in this embodiment is executed, step 401 to step 403 are not necessarily performed each time, but are performed only when the manner provided in this embodiment is executed for the first time. After the user attribute model and the user attribute rule base are established in step 401 to step 403, a speech interaction process can be performed in the following step 404 to step 408.

404. Acquire speech data of a user, and perform content recognition on the speech data to obtain a content recognition result of the speech data.

When the speech data of the user is to be acquired, a starting point and an ending point of user speech may be detected; and speech data between the starting point and the ending point is acquired, and the acquired speech data is used as speech data of the user. For example, it is detected that a starting point of user speech is 10:00:00 and an ending point is 10:00:05. The data of the speech lasting for 5 seconds between 10:00:00 and 10:00:05 is used as speech data of the user.

In addition, the following manner may be adopted when the content recognition is performed on the speech data of the user: performing recognition on the speech data of the user by adopting a background acoustic model and a foreground acoustic model. The background acoustic model adopts a Mono-phone technology that is based on LVCSR (Large Vocabulary Continuous Speech Recognition), and the foreground acoustic model adopts an LVC SR-based Triphone technology, so as to build an acoustic resource in advance on a speech recognition server by using a decoding network, where the acoustic resource includes a table of a correspondence between each sound feature vector and a command character corresponding to each sound feature vector. When recognition is performed on the speech data of the user, spectral transformation is first performed on the speech data of the user to obtain a corresponding acoustic feature vector, and then the acoustic resource built in advance is searched for a command character corresponding to the acoustic feature vector, where the command character is the obtained content recognition result of the speech data.

Certainly, in addition to the foregoing manner of performing recognition on a first speech, another recognition manner may also be adopted, which is not specifically limited in this embodiment.

405. Collect a user image, and when it is detected that the number of people in the user image is a preset value, perform user attribute recognition on the speech data to obtain a first user attribute recognition result.

When the user image is collected, a camera of a terminal may be used to collect only one frame of image. In this embodiment, the preset value is set to 1. That is, when detection is performed based on the number of people in the user image, if it is detected that the number of people is greater than 1, it is considered that it is in a public place currently and no user attribute recognition is performed on the speech data. For example, a smart television set detects, by using a camera, that a family of three is currently watching a television program, and in this case, no user attribute recognition is performed on speech data. If it is detected that the number of people is 1 (may also be 0 when no image is captured by the camera due to relatively dim light), it is considered by default that it is in a private scenario, that is, a scenario in which the user performs an operation on a terminal device alone, for example, the user performs an operation on a smart mobile terminal, and in this case, user attribute recognition is performed on speech data.

The following recognition manner may be adopted when user attribute recognition is performed on speech data: performing frequency domain transformation processing on the speech data to obtain a spectrum signature of the speech data; and searching, in a preset correspondence between each spectrum signature and each user attribute recognition result, for a user attribute recognition result corresponding to the spectrum signature of the speech data, and using a found user attribute recognition result as the first user attribute recognition result of the speech data. The first user attribute recognition result includes a first gender attribute recognition result and a first age attribute recognition result. For example, a pitch frequency of a spectrum signature of speech data is 185 Hz; because the value falls within a range from 100 Hz to 200 Hz of a pitch frequency of a male, a user who inputs the speech data is a male, that is, the first user attribute recognition result is male; in addition, if density of frequency waveforms of the speech data is corresponding to density of frequency waveforms of speech data of elderly people, an obtained first age recognition result is elderly people.

Certainly, in addition to the foregoing manner of performing user attribute recognition on speech data, another recognition manner may also be adopted, which is not specifically limited in this embodiment.

Optionally, when this step is performed, a user image may not be collected and the number of people in the user image may not be detected, but user attribute recognition is directly performed on the speech data. That is, a process of performing user attribute recognition on speech data may not be restricted by the number of people in a user image. User attribute recognition is performed on speech data regardless of the number of people in a user image. If no user image is collected, when this embodiment is executed, step 406 and step 407 may be skipped directly and step 408 may be performed directly.

406. Extract face data from the user image, and perform face recognition on the face data to obtain a second user attribute recognition result.

In this embodiment, when the number of people in the user image is 1, in order to enable the speech application module in FIG. 3 to obtain a more precise recognition result, so as to perform a corresponding operation according to the precise recognition result, face data of the user image is further extracted and face recognition is performed on the face data. Before recognition is performed on the face data, a manner of machine learning or statistical learning may also be adopted. That is, a large number of face samples may be collected in advance. A facial feature such as skin textures and a face shape and structure of each face sample is analyzed, and the facial feature such as skin textures and a face shape and structure is summarized according to attribute information of a provider of each face sample such as a gender and an age, so as to obtain a correspondence between the facial feature such as a skin texture and a face shape and structure and the gender attribute, and a correspondence between the facial feature such as skin textures and a face shape and structure and the age attribute. In this way, after the face data is extracted, a second gender attribute recognition result and a second age attribute recognition result that are corresponding to the face data can be obtained according to the foregoing correspondences.

407. Weight the first user attribute recognition result and the second user attribute recognition result to obtain a final user attribute recognition result.

Before the first user attribute recognition result and the second user attribute recognition result are weighted, a weight corresponding to the first user attribute recognition result and a weight corresponding to the second user attribute recognition result further need to be set. When the weights are set, the weight corresponding to the first user attribute recognition result is generally greater than the weight corresponding to the second user attribute recognition result. For example, the weight corresponding to the first user attribute recognition result is 0.6, and the weight corresponding to the second user attribute recognition result is 0.4. Certainly, the weight of the first user attribute recognition result may also be less than the weight of the second user attribute recognition result, which is not specifically limited in this embodiment. A weight setting may be determined depending on a specific case. This embodiment provides merely one possible setting manner.

The first user attribute recognition result includes the first gender attribute recognition result and the first age attribute recognition result, and the second user attribute recognition result includes the second gender attribute recognition result and the second age attribute recognition result. Therefore, when the first user attribute recognition result and the second user attribute recognition result are weighted, the first gender attribute recognition result and the second gender attribute recognition result are weighted and summed to obtain a final gender attribute recognition result; and the first age attribute recognition result and the second age attribute recognition result are weighted and summed to obtain a final age attribute recognition result. The final gender attribute recognition result and the final age attribute recognition result form the final user attribute recognition result.

408. Perform a corresponding operation according to the final user attribute recognition result and the content recognition result.

In this embodiment, the performing a corresponding operation according to the final user attribute recognition result and the content recognition result may be implemented in the following manner: determining vocabulary content corresponding to the final user attribute recognition result; and performing a corresponding operation according to the vocabulary content corresponding to the final user attribute recognition result and according to the content recognition result.

To enable the speech application module in FIG. 3 to precisely perform an operation that matches a user intent, the user attribute recognition module in FIG. 3 further determines vocabulary content corresponding to the final user attribute recognition result and directly transmits the vocabulary content to the speech application module, and the speech application module performs a corresponding operation directly according to the vocabulary content corresponding to the final user attribute recognition result and according to the content recognition result. The determining vocabulary content corresponding to the final user attribute recognition result may be specifically implemented in the following manner: searching, in a preset correspondence between the gender attribute and a vocabulary and a preset correspondence between the age attribute and a vocabulary, for a vocabulary corresponding to the final user recognition result, and using a found vocabulary as the vocabulary content corresponding to the final user attribute recognition result.

The following uses several specific examples to describe in detail the performing a corresponding operation directly according to the vocabulary content corresponding to the final user attribute recognition result and according to the content recognition result.

For a smart television set, if speech data input by a user is "I want to watch a sports program", and if the user attribute recognition module determines that a final user attribute recognition result corresponding to a current speech is an elderly female, vocabulary content corresponding to the elderly female is determined according to a user attribute rule base. As can be learnt from step 402, the vocabulary content corresponding to the elderly female may be cuisine, livelihood after retirement, leisure, health, medical treatment, current events, tai chi chuan, gate ball, or the like. Consequently, after combining the foregoing vocabulary content and the speech content recognition result "I want to watch a sports program", the speech application module switches a current channel to a channel that is currently playing a program, such as tai chi chuan or gate ball, that is suitable for elderly people to watch.

For a smart mobile terminal, if speech data input by a user is "Recommend some books related to babies", and if the user attribute recognition module determines that a final user attribute recognition result corresponding to a current speech is an adult female, vocabulary content corresponding to the adult female is determined according to a user attribute rule base. As can be learnt from step 402, the vocabulary content corresponding to the adult female may be cosmetics, baby feeding, gymnastics, low risk, fashion, cuisine, fine foods, or the like. Consequently, after combining the foregoing vocabulary content and the speech content recognition result "Recommend some books related to babies", the speech application module searches for some books related to baby raising and feeding and feeds back an obtained searching result to a display interface of the smart mobile terminal for the end user's reference.

Optionally, if the user attribute further includes another attribute such as an occupation attribute, and if speech data input by a user is "Recommend some financing products", when the user attribute recognition module determines that the final user attribute recognition result is a white-collar IT male, the speech application module searches for some bank financing products that have relatively high risks, and recommends an obtained searching result to the user; when the user attribute recognition module determines that the final user attribute recognition result is a housewife, the speech application module searches for some principal-protected financing products that have relatively low risks, and recommends a searching result to the user.

In addition, if it is detected that the number of people in the user image is greater than 1, step 405 to step 407 may be skipped and step 408 may be performed directly. In this case, the final user attribute recognition result is blank, and the speech application module performs a corresponding operation merely according to the content recognition result of the speech data. That is, when it is detected that the number of people in the user image is greater than 1, the user attribute recognition module and the face recognition module do not perform recognition processing.

It should be noted that, when the method provided in this embodiment is executed, after acquiring speech data of the user in step 401 to step 408, the speech application module directly transmits the speech data transparently without any preprocessing, and the speech recognition module and the user attribute recognition module perform preprocessing on the speech data. Optionally, after the speech application module acquires the speech data of the user, the speech application module may further perform preprocessing on the speech data, and send the preprocessed speech data to the content recognition module and the user attribute recognition module. A specific adopted manner of processing speech data is not specifically limited in this embodiment.

In a method provided in this embodiment, after speech data of a user is acquired, user attribute recognition and content recognition are separately performed on the speech data to obtain a first user attribute recognition result and a content recognition result of the speech data, and a corresponding operation is performed according to at least the first user attribute recognition result and the content recognition result. Because attribute recognition is performed on the speech data, and user attributes of different users may be different, response operations that are performed or results that are returned may also be different even for a same content recognition result. For example, if speech data input by a male user and a female user is both "I want to watch a spots program" and the method provided in this embodiment is used, for the female user, a channel that is suitable for the female user to watch and is playing feature skating, gymnastics, or the like may be switched to; for the male user, a channel that is suitable for the male user to watch and is playing football, basketball, or the like may be switched to. As a result, a same speech corresponds to multiple forms of response, which not only enriches manners of responding to speech and improves flexibility of responding to speech, but also makes a speech response result better satisfy a user requirement.

Figure 5:
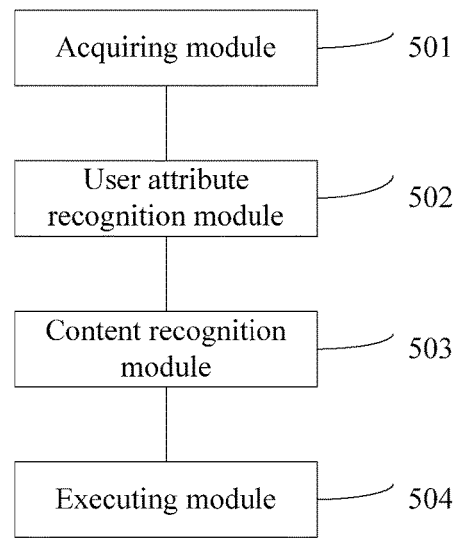
FIG. 5 is a schematic structural diagram of a speech interaction apparatus according to Embodiment 3 of the present invention.

This embodiment of the present invention provides a speech interaction apparatus for a user to execute the method shown in Embodiment 1 or Embodiment 2. Referring to FIG. 5, the apparatus includes: an acquiring module 501, a user attribute recognition module 502, a content recognition module 503, and an executing module 504.

The acquiring module 501 is configured to acquire speech data of the user. The user attribute recognition module 502 is connected to the acquiring module 501 and is configured to perform user attribute recognition on the speech data to obtain a first user attribute recognition result. The content recognition module 503 is connected to the user attribute recognition module 502 and is configured to perform content recognition on the speech data to obtain a content recognition result of the speech data. The executing module 504 is connected to the content recognition module 503 and is configured to perform a corresponding operation according to at least the first user attribute recognition result and the content recognition result, so as to respond to the speech data.

Optionally, the apparatus further includes:
a collecting module, configured to collect a user image, where
the user attribute recognition module is configured to, when it is detected that the number of people in the user image is a preset value, perform the step of performing user attribute recognition on the speech data.

Optionally, the apparatus further includes:
an extracting module, configured to extract face data from the user image; and
a face recognition module, configured to perform face recognition on the face data to obtain a second user attribute recognition result.

Optionally, the executing module includes:
a weighting unit, configured to weight the first user attribute recognition result and the second user attribute recognition result to obtain a final user attribute recognition result; and
an executing unit, configured to perform a corresponding operation according to the final user attribute recognition result and the content recognition result.

Optionally, the executing unit includes:
a determining subunit, configured to determine vocabulary content corresponding to the final user attribute recognition result; and
an executing subunit, configured to perform a corresponding operation according to the vocabulary content corresponding to the final user attribute recognition result and according to the content recognition result.

Optionally, the apparatus further includes:
a user attribute setting module, configured to preset a user attribute, where the user attribute includes at least a gender attribute and an age attribute; and
a vocabulary correspondence setting module, configured to preset multiple vocabularies corresponding to the gender attribute and multiple vocabularies corresponding to the age attribute, and store correspondences; where
the determining subunit is configured to search, in a preset correspondence between the gender attribute and a vocabulary and a preset correspondence between the age attribute and a vocabulary, for a vocabulary corresponding to the final user recognition result, and use a found vocabulary as the vocabulary content corresponding to the final user attribute recognition result.

Optionally, the apparatus further includes:
a spectrum signature setting module, configured to preset a correspondence between a spectrum signature and a user attribute recognition result, where the user attribute recognition result includes at least a gender attribute recognition result and an age attribute recognition result, where
the user attribute recognition module is configured to perform frequency domain transformation processing on the speech data to obtain a spectrum signature of the speech data; and search, in a preset correspondence between each spectrum signature and each user attribute recognition result, for a user attribute recognition result corresponding to the spectrum signature of the speech data, and use a found user attribute recognition result as the first user attribute recognition result of the speech data.

In conclusion, in an apparatus provided in this embodiment of the present invention, after speech data of a user is acquired, user attribute recognition and content recognition are separately performed on the speech data to obtain a first user attribute recognition result and a content recognition result of the speech data, and a corresponding operation is performed according to at least the first user attribute recognition result and the content recognition result. Because attribute recognition is performed on the speech data, and user attributes of different users may be different, response operations that are performed or results that are returned may also be different even for a same content recognition result. As a result, a same speech corresponds to multiple forms of response, which not only enriches manners of responding to speech and improves flexibility of responding to speech, but also makes a speech response result better satisfy a user requirement.

Figure 6:
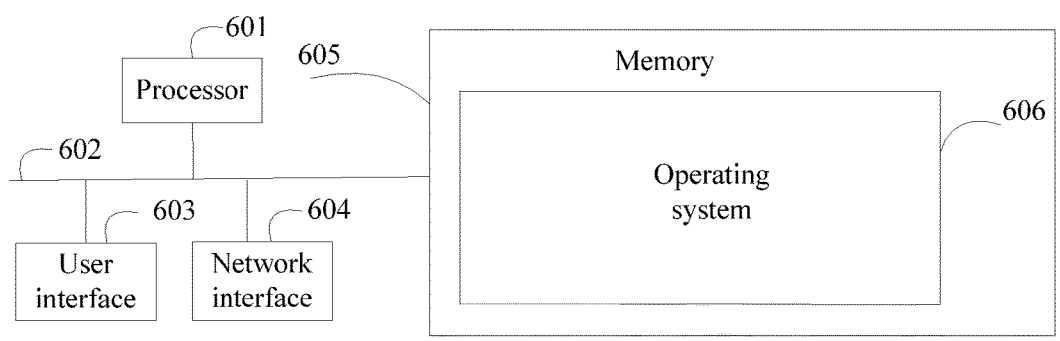
FIG. 6 is a schematic structural diagram of a speech interaction device according to Embodiment 4 of the present invention.

The present invention provides a schematic structural diagram of a speech interaction device. Referring to FIG. 6, the device includes at least one processor 601, such as a CPU, at least one network interface 604, or a user interface 603, a memory 605, and at least one communications bus 602. The communications bus 602 is configured to implement connection and communication between the apparatuses. The user interface 603 may be a display, a keyboard, or a click device. The memory 605 may include a high-speed RAM memory, and may further include a non-volatile memory (non-volatile memory), for example, at least one disk storage.

The processor 601 is configured to execute a program stored in the memory 605, so as to implement the following method:
acquiring speech data of a user; performing user attribute recognition on the speech data to obtain a first user attribute recognition result; performing content recognition on the speech data to obtain a content recognition result of the speech data; performing a corresponding operation according to at least the first user attribute recognition result and the content recognition result, so as to respond to the speech data.

Further, the processor 601 is specifically configured to collect a user image; and when it is detected that the number of people in the user image is a preset value, perform the step of performing user attribute recognition on the speech data.

Further, the processor 601 is specifically configured to extract face data from the user image; and perform face recognition on the face data to obtain a second user attribute recognition result.

Further, the processor 601 is specifically configured to weight the first user attribute recognition result and the second user attribute recognition result to obtain a final user attribute recognition result; and perform a corresponding operation according to the final user attribute recognition result and the content recognition result.

Further, the processor 601 is specifically configured to preset a user attribute, where the user attribute includes at least a gender attribute and an age attribute; and preset multiple vocabularies corresponding to the gender attribute and multiple vocabularies corresponding to the age attribute, and store correspondences; and the determining vocabulary content corresponding to the final user attribute recognition result includes: searching, in a preset correspondence between the gender attribute and a vocabulary and a preset correspondence between the age attribute and a vocabulary, for a vocabulary corresponding to the final user recognition result, and using a found vocabulary as the vocabulary content corresponding to the final user attribute recognition result.

Further, the processor 601 is specifically configured to preset a correspondence between a spectrum signature and a user attribute recognition result, where the user attribute recognition result includes at least a gender attribute recognition result and an age attribute recognition result; and the performing user attribute recognition on the speech data to obtain a first user attribute recognition result of the speech data includes: performing frequency domain transformation processing on the speech data to obtain a spectrum signature of the speech data; and searching, in a preset correspondence between each spectrum signature and each user attribute recognition result, for a user attribute recognition result corresponding to the spectrum signature of the speech data, and using a found user attribute recognition result as the first user attribute recognition result of the speech data.

In the device provided in this embodiment, after speech data of a user is acquired, user attribute recognition and content recognition are separately performed on the speech data to obtain a first user attribute recognition result and a content recognition result of the speech data, and a corresponding operation is performed according to at least the first user attribute recognition result and the content recognition result. Because attribute recognition is performed on the speech data, and user attributes of different users may be different, response operations that are performed or results that are returned may also be different even for a same content recognition result. As a result, a same speech corresponds to multiple forms of response, which not only enriches manners of responding to speech and improves flexibility of responding to speech, but also makes a speech response result better satisfy a user requirement.

It should be noted that: when the speech interaction apparatus provided in the foregoing embodiment performs speech interaction, division of the foregoing functional modules is used merely for illustration. In an actual application, the foregoing functions may be allocated to different functional modules for implementation according to a requirement. That is, an internal structure of the apparatus is divided into different functional modules to perform all or a part of the functions described above. In addition, the speech interaction apparatus provided in the foregoing embodiment and the speech interaction method embodiment belong to a same conception. For a specific implementation process, refer to the method embodiments, and details are not described herein again.

Serial numbers in the embodiments of the present invention are merely for description, and do not represent superiority or inferiority of the embodiments.

A person of ordinary skill in the art may understand that all or a part of the steps of the embodiments may be implemented by hardware or a program instructing relevant hardware. The program may be stored in a computer readable storage medium. The storage medium may include: a read-only memory, a magnetic disk, or an optical disc.

The foregoing descriptions are merely exemplary embodiments of the present invention, but are not intended to limit the present invention. Any modification, equivalent replacement, and improvement made without departing from the spirit and principle of the present invention shall fall within the protection scope of the present invention.

The invention claimed is:

1. A speech interaction method, comprising:
   acquiring, by a speech interaction apparatus, speech data of a user;
   presetting, by the speech interaction apparatus, a user attribute, wherein the user attribute comprises at least a gender attribute and an age attribute;
   presetting, by the speech interaction apparatus, multiple vocabularies corresponding to the gender attribute and multiple vocabularies corresponding to the age attribute;
   performing, by the speech interaction apparatus, user attribute recognition on the speech data to obtain a first user attribute recognition result, wherein the user attribute is used to represent a user identity;
   performing, by the speech interaction apparatus, content recognition on the speech data to obtain a content recognition result of the speech data; and
   performing, by the speech interaction apparatus, a corresponding operation according to at least the first user attribute recognition result and the content recognition result, so as to respond to the speech data,
   wherein the performing a corresponding operation according to at least the first user attribute recognition result and the content recognition result comprises:
      determining, by the speech interaction apparatus, vocabulary content corresponding to the first user attribute recognition result by searching, in a preset correspondence between the gender attribute and a vocabulary and a preset correspondence between the age attribute and a vocabulary, for a vocabulary corresponding to the first user attribute recognition result, and using a found vocabulary as the vocabulary content corresponding to the first user attribute recognition result.

2. The method according to claim 1, further comprising:
   collecting, by the speech interaction apparatus, a user image; and
   when it is detected that a number of people in the user image is a preset value, performing, by the speech interaction apparatus, the step of performing user attribute recognition on the speech data.

3. The method according to claim 2, after it is detected that the number of people in the user image is a preset value, the method further comprising:

extracting, by the speech interaction apparatus, face data from the user image; and performing, by the speech interaction apparatus, face recognition on the face data to obtain a second user attribute recognition result.

4. The method according to claim 3, wherein the performing a corresponding operation according to at least the first user attribute recognition result and the content recognition result comprises:

weighting, by the speech interaction apparatus, the first user attribute recognition result and the second user attribute recognition result to obtain a final user attribute recognition result; and performing, by the speech interaction apparatus, a corresponding operation according to the final user attribute recognition result and the content recognition result.

5. The method according to claim 4, wherein the performing a corresponding operation according to the final user attribute recognition result and the content recognition result comprises:

determining, by the speech interaction apparatus, vocabulary content corresponding to the final user attribute recognition result; and performing, by the speech interaction apparatus, a corresponding operation according to the content recognition result and the vocabulary content corresponding to the final user attribute recognition result.

6. The method according to claim 5, the method further comprises:

presetting, by the speech interaction apparatus, a user attribute, wherein the user attribute comprises at least a gender attribute and an age attribute; and presetting, by the speech interaction apparatus, multiple vocabularies corresponding to the gender attribute and multiple vocabularies corresponding to the age attribute, and storing correspondences; and the determining vocabulary content corresponding to the final user attribute recognition result comprises:

searching, by the speech interaction apparatus, in a preset correspondence between the gender attribute and a vocabulary and a preset correspondence between the age attribute and a vocabulary, for a vocabulary corresponding to the final user attribute recognition result, and using a found vocabulary as the vocabulary content corresponding to the final user attribute recognition result.

7. The method according to claim 1, the method further comprises:

presetting, by the speech interaction apparatus, a correspondence between a spectrum signature and a user attribute recognition result, wherein the user attribute recognition result comprises at least a gender attribute recognition result and an age attribute recognition result; and the performing user attribute recognition on the speech data to obtain a first user attribute recognition result of the speech data comprises:

performing, by the speech interaction apparatus, frequency domain transformation on the speech data to obtain a spectrum signature of the speech data; and searching, by the speech interaction apparatus, in a preset correspondence between each spectrum signature and each user attribute recognition result, for a user attribute recognition result corresponding to the spectrum signature of the speech data, and using a found user attribute recognition result as the first user attribute recognition result of the speech data.

8. A speech interaction apparatus, comprising:

a processor and a memory storing program;

the processor is configured to execute the program stored in the memory, and perform operations comprising:

acquiring speech data of a user;

presetting a user attribute, wherein the user attribute comprises at least a gender attribute and an age attribute; and presetting multiple vocabularies corresponding to the gender attribute and multiple vocabularies corresponding to the age attribute;

performing user attribute recognition on the speech data to obtain a first user attribute recognition result, wherein the user attribute is used to represent a user identity;

performing content recognition on the speech data to obtain a content recognition result of the speech data; and performing a corresponding operation according to at least the first user attribute recognition result and the content recognition result, so as to respond to the speech data, wherein the performing a corresponding operation according to at least the first user attribute recognition result and the content recognition result comprises:

determining vocabulary content corresponding to the first user attribute recognition result by searching, in a preset correspondence between the gender attribute and a vocabulary and a preset correspondence between the age attribute and a vocabulary, for a vocabulary corresponding to the first user attribute recognition result, and using a found vocabulary as the vocabulary content corresponding to the first user attribute recognition result.

9. The apparatus according to claim 8, wherein the operations further comprises:

collecting a user image; and when it is detected that a number of people in the user image is a preset value, performing the step of performing user attribute recognition on the speech data.

10. The apparatus according to claim 9, wherein the operations further comprises:

extracting, after it is detected that the number of people in the user image is a preset value, face data from the user image; and performing face recognition on the face data to obtain a second user attribute recognition result.

11. The apparatus according to claim 10, wherein the operations further comprises:

weighting the first user attribute recognition result and the second user attribute recognition result to obtain a final user attribute recognition result; and performing a corresponding operation according to the final user attribute recognition result and the content recognition result.

12. The apparatus according to claim 11, wherein the operations further comprises:

determining vocabulary content corresponding to the final user attribute recognition result; and performing a corresponding operation according to the content recognition result and the vocabulary content corresponding to the final user attribute recognition result.

13. The apparatus according to claim 12, wherein the operations further comprises:
   presetting the user attribute, wherein the user attribute comprises at least a gender attribute and an age attribute; and
   presetting multiple vocabularies corresponding to the gender attribute and multiple vocabularies corresponding to the age attribute, and storing correspondences; and
   searching in a preset correspondence between the gender attribute and a vocabulary and a preset correspondence between the age attribute and a vocabulary, for a vocabulary corresponding to the final user attribute recognition result, and using a found vocabulary as the vocabulary content corresponding to the final user attribute recognition result.

14. The apparatus according to claim 8, wherein the operations further comprises:
   presetting a correspondence between a spectrum signature and a user attribute recognition result, wherein the user attribute recognition result comprises at least a gender attribute recognition result and an age attribute recognition result; and
   performing frequency domain transformation on the speech data to obtain a spectrum signature of the speech data; and
   searching in a preset correspondence between each spectrum signature and each user attribute recognition result, for a user attribute recognition result corresponding to the spectrum signature of the speech data, and using a found user attribute recognition result as the first user attribute recognition result of the speech data.

* * * * *